United States Patent [19]

Wallis

[11] Patent Number: 5,235,859

[45] Date of Patent: Aug. 17, 1993

[54] CONTROL CONSOLE FOR GAS DIE CYLINDER SYSTEMS

[76] Inventor: Bernard J. Wallis, 2215 Dacosta, Dearborn, Mich. 48128

[21] Appl. No.: 730,673

[22] Filed: Jul. 16, 1991

[51] Int. Cl.⁵ .................................. G01L 7/00
[52] U.S. Cl. .......................... 73/756; 73/707; 137/227
[58] Field of Search .............. 73/714, 756, 707; 137/843, 227, 228; 72/351

[56] References Cited

U.S. PATENT DOCUMENTS 1,915,899  6/1933  Monro et al. ............... 137/227
4,056,965  11/1977  Heiser ......................... 137/843

Primary Examiner—Donald O. Woodiel

Attorney, Agent, or Firm—Barnes, Kisselle, Raisch, Choate, Whittemore & Hulbert

[57] ABSTRACT

A control console for a gas die cylinder system which includes a plurality of gas die cylinders to which gas under pressure is provided wherein the control console comprises a body including an inlet for gas, a pressure chamber communicating with said inlet, a visual pressure gauge of the direct pressure type communicating with the chamber. An outlet extends from the chamber to the exterior of the body and a one way pressure control valve is provided between the outlet and the chamber and operable upon predetermined pressure in the outlet to modulate and maintain the pressure in the chamber at a predetermined pressure thereby minimizing oscillations and vibrations in the direct type pressure gauge.

4 Claims, 3 Drawing Sheets

CONTROL CONSOLE FOR GAS DIE CYLINDER SYSTEMS

This invention relates to a control console for a gas die cylinder system.

BACKGROUND AND SUMMARY OF THE INVENTION

In gas die cylinder systems utilized with die stamping apparatus, it is customary to use a plurality of gas cylinders to help control and absorb the load on one of the elements of the die stamping mechanism.

In one type system, individual die cylinders are connected by lines to a source of gaseous pressure. In another system, the die cylinders are mounted on a manifold to which gaseous fluid is provided. In both types, a gas control console is utilized which includes a visual pressure gauge indicating the pressure in the system. There has been no system of which the present inventor is aware, which would permit the use of a direct pressure gauge which is less expensive.

Accordingly, among the objectives of the present invention are to provide a gaseous pressure console for gas die cylinder systems which includes a plurality of gas die cylinders to which gas under pressure is provided; which can be utilized with a visual pressure gauge of the direct reading pressure type; which console can be modified at minimal cost from the presently available consoles and which will be effective to provide a steady reading that can be readily observed by an operator without vibrations and oscillations.

In accordance the invention, a control console for a gas die cylinder system which includes a plurality of gas die cylinders to which gas under pressure is provided wherein the control console comprises a body including an inlet for gas, a pressure chamber communicating with said inlet, a visual pressure gauge of the direct pressure type communicating with said chamber, an outlet extending from said chamber to the exterior of the body and a one way pressure control valve between said outlet and said chamber operable upon predetermined pressure in said outlet to modulate and maintain the pressure in the chamber at a predetermined pressure thereby minimizing oscillations and vibrations in the direct type pressure gauge.

DESCRIPTION

In gas die cylinder systems utilized with die stamping apparatus, it is customary to use a plurality of cylinders to help control and absorb the load on the elements A, B of the die stamping mechanism.

Figure 1:
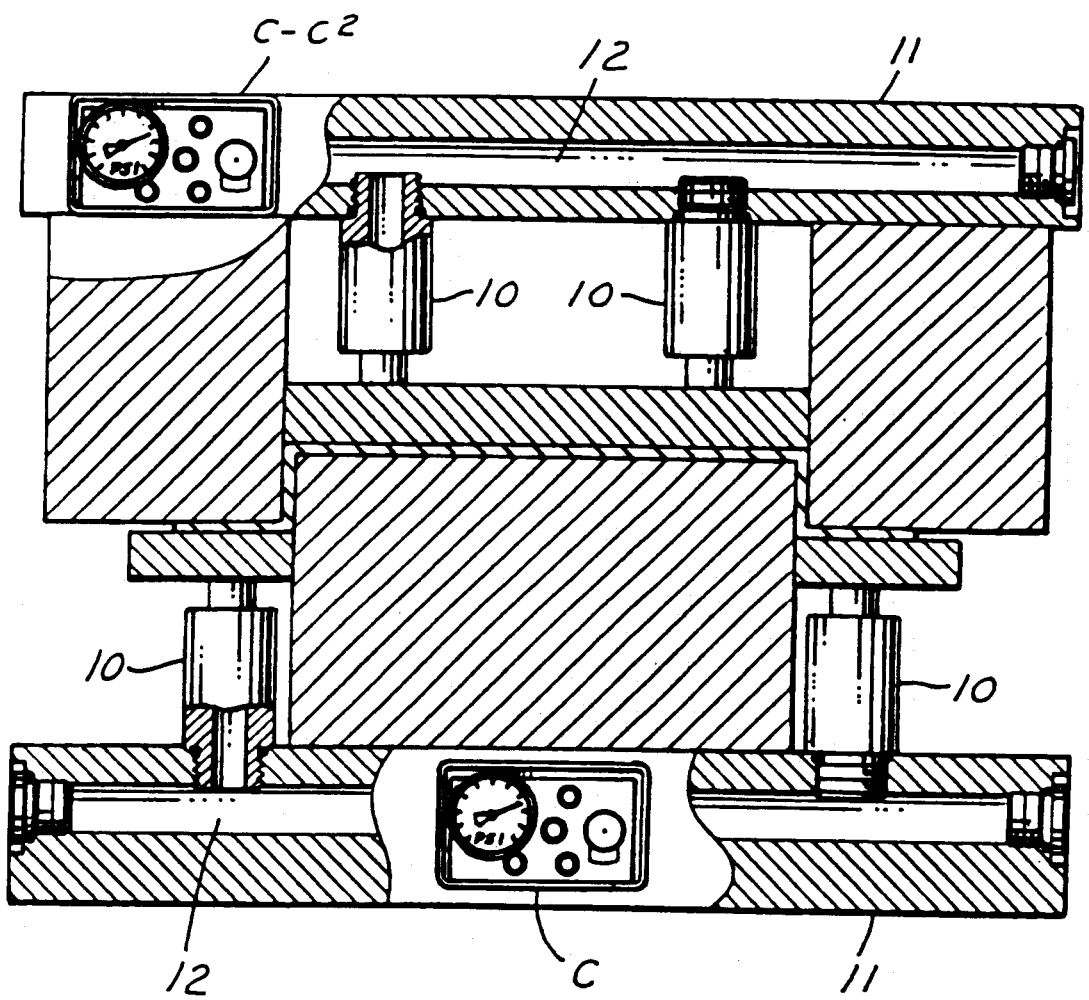
FIG. 1 is a fragmentary sectional view of a general system embodying the invention.

In one type of system shown in FIG. 1, the die cylinders 10 are mounted on a manifold 11 which includes a plenum 12 to which gaseous fluid is provided. In another type of system as shown in FIG. 2, individual die cylinders 13 are connected by lines 14, 15 from console C' to distributor blocks 16 on which the cylinders 13 are mounted.

In both types, a gas control console C or C' is utilized which includes a visual pressure gage indicating the pressure in the system. There has been no system of which the present inventor is aware, which would permit the use of a direct pressure gauge.

Figure 5:
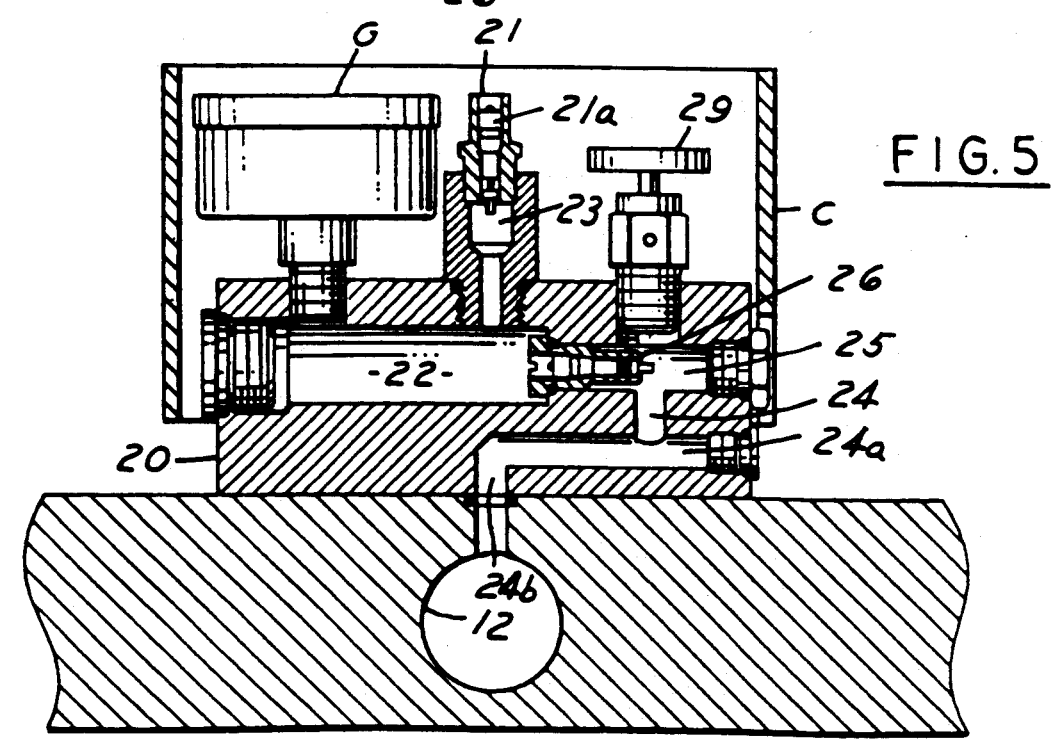
FIG. 5 is a sectional view of console shown in FIG. 1.

Referring to FIG. 5, a control console C for a gas die cylinder system such as shown in FIG. 1 comprises a body 20 including an inlet 21 for gas to plenum 12 and a one-way charging valve 21a in the inlet 21. A pressure chamber 22 communicates with the inlet 21 through a passage 23. A visual pressure gauge G of the direct pressure type is mounted on the body 20 and communicates with chamber 22. The gauge G can be of any type having indicia showing a reading. As shown, gauge G includes a dial D with indicia and a needle N. Passage 25 extends from chamber 22 and a one way pressure control valve 26 is positioned between passage 25 and chamber 22. Valve 26 is operable upon predetermined pressure in passage 25 through passages 24, 24a and 24b to modulate and maintain the pressure in the chamber 22 at a predetermined pressure thereby minimizing oscillations in the direct type pressure gauge G. A manually operated exhaust valve 29 is provided for exhausting chamber 25 when desired. The gauge can be of any type having indicia showing a reading.

Figure 2:
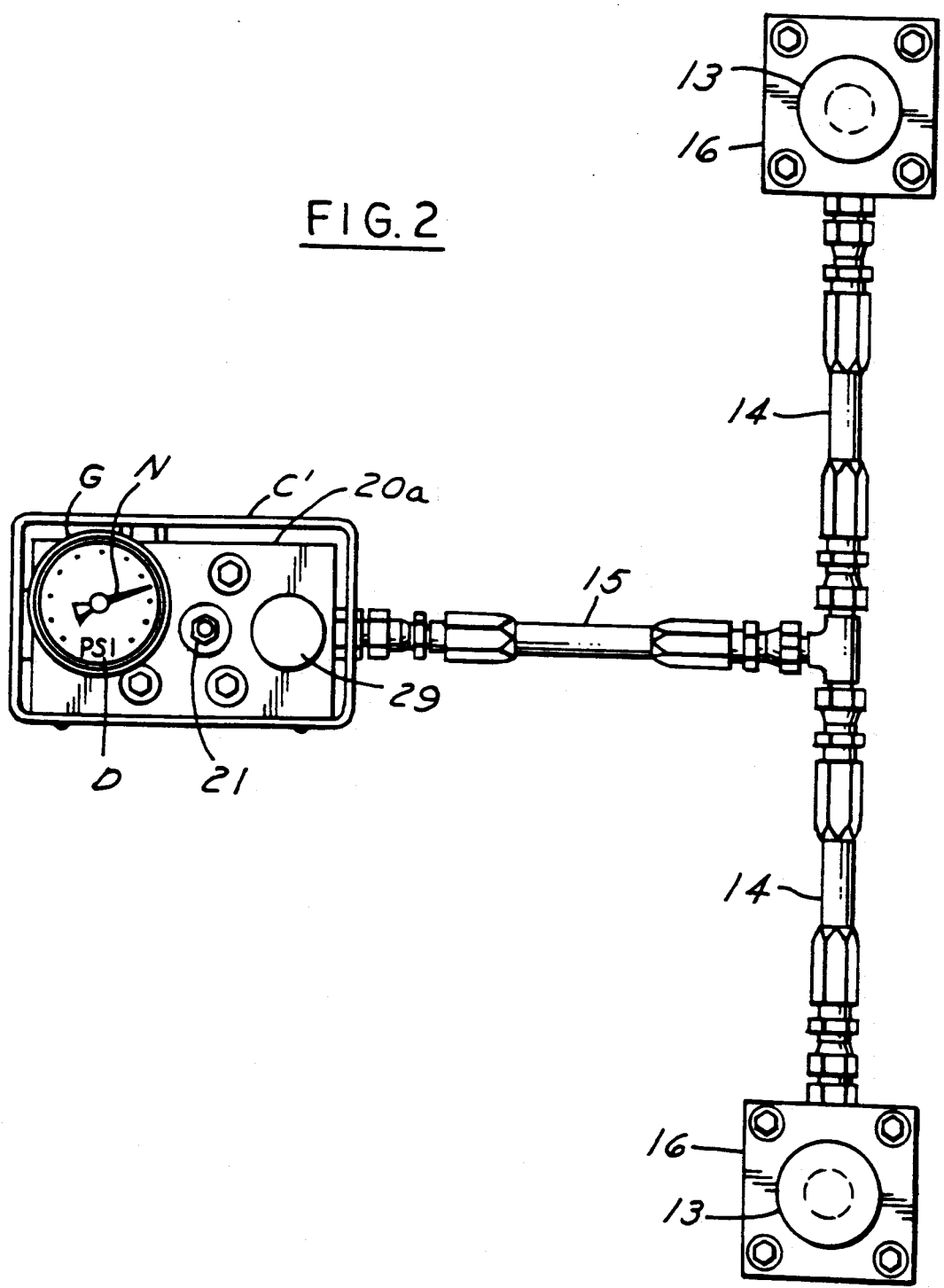
FIG. 2 is a plan view of a modified gas control console embodying the invention.
Figure 3:
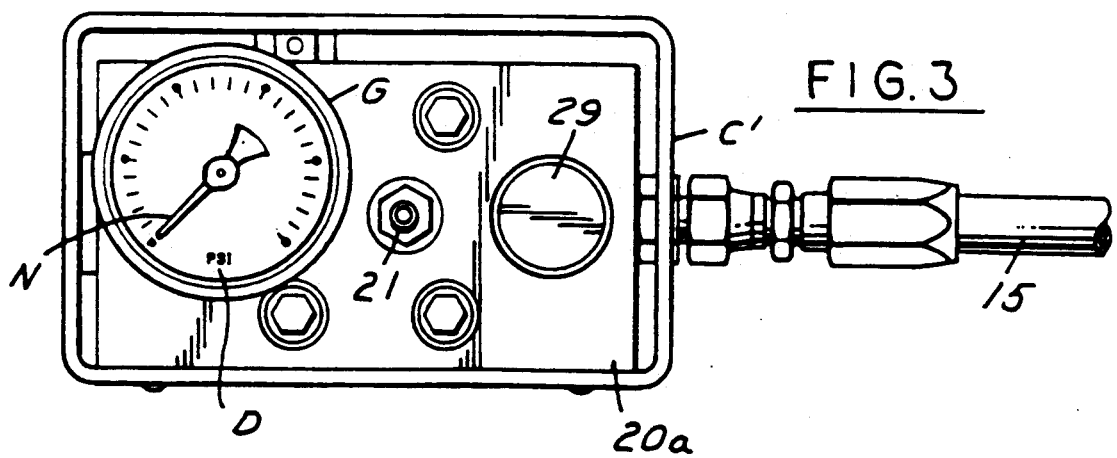
FIG. 3 is an enlarged elevational view of the modified form of console.
Figure 4:
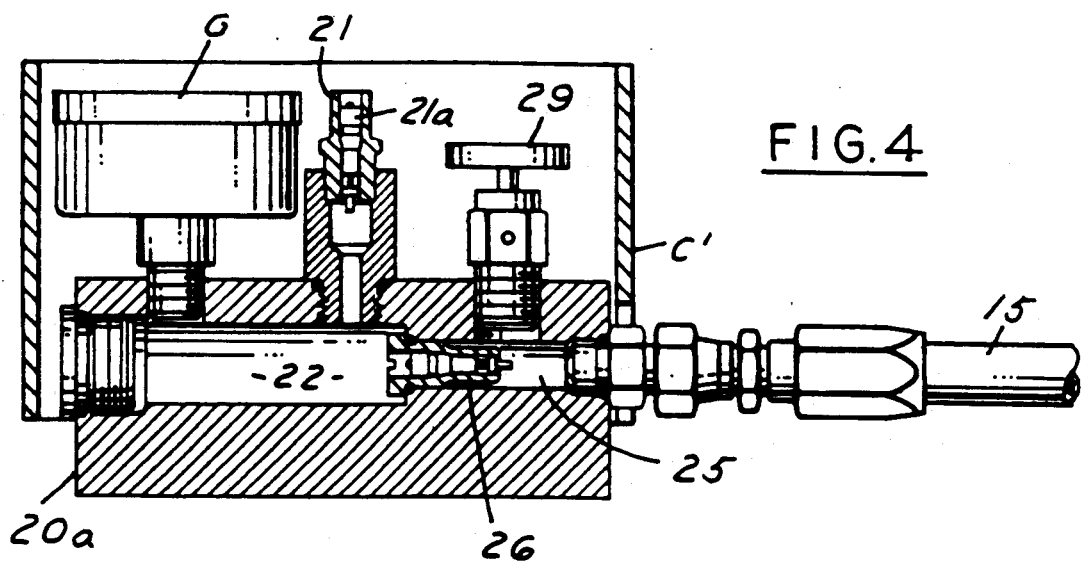
FIG. 4 is a sectional view taken along the line 4—4 in FIG. 1.

In the modified form shown in FIGS. 2-4, for use with the system shown in FIG. 2, the console C' has a modified body providing for an passage 21a to the lines 14, 15 shown in FIG. 5. In this form, body 20a does not have a passages 21, 24 and 24. In all other respects, the console C' is corresponding parts having the suffix "a".

Although the invention has been shown as being directed to a console uitlizing a visual pressure gauge of the direct pressure type, it is also applicable to other types of direct pressure reading gauges utilizing indicia other than a needle and dial.

It can thus be seen that there has been provided a control console for a gas die cylinder system which includes a plurality of gas die cylinders to which gas under pressure is provided wherein the control console comprises a body including an inlet for gas, a pressure chamber communicating with said inlet, a visual pressure gauge of the direct pressure type communicating with said chamber, an outlet extending from said chamber to the exterior of the body and a one way pressure control valve between said outlet and said chamber operable upon predetermined pressure in said outlet to modulate and maintain the pressure in the chamber at a predetermined pressure thereby minimizing oscillations and vibrations in the direct type pressure gauge.

It can thus be seen that there has been provided a gaseous pressure console for gas die cylinder systems which includes a plurality of gas die cylinders to which gas under pressure is provided; which can be utilized with a visual pressure gauge of the direct reading pressure type; which console can be modified at minimal cost from the presently available consoles and which will be effective to provide a steady reading that can be readily observed by an operator without vibration and oscillations.

I claim:

1. A control console (C) for a gas die cylinder system which includes a plurality of gas die cylinders to which gas under pressure is provided comprising a body (20) including an inlet (21) for gas, a pressure chamber (22) communicating with said inlet (22), a visual pressure gauge (G) of the direct pressure type communicating with said chamber, a passage (25) extending from said chamber (21) to the exterior of the body, and a one way pressure control valve (26) in said body between said passage (25) and said chamber (22) operable upon predetermined pressure in said inlet to modulate and maintain the pressure in the chamber (22) at a predetermined pressure thereby minimizing oscillation in the direct type pressure gauge.

2. The control console set forth in claim 1 including an exhaust valve communicating between said chamber and the exterior of said body.

3. The control console set forth in claim 1 including a manifold having a plenum, said console being mounted on said manifold with said passage communicating with said plenum.

4. The control console set forth in claim 1 including a plurality of distributor blocks for supplying gas cylinders and fluid lines extending from said passage to each said block.

* * * * *